(12) United States Patent
Sun et al.

(10) Patent No.: US 8,397,229 B2
(45) Date of Patent: Mar. 12, 2013

(54) SYSTEM AND METHODS FOR MIGRATING INDEPENDENTLY EXECUTING PROGRAM INTO AND OUT OF AN OPERATING SYSTEM

(75) Inventors: Jun Sun, Fremont, CA (US); Steve Koert Longerbeam, San Jose, CA (US)

(73) Assignee: Netspectrum Inc., Fremont, CA (US)

( * ) Notice: Subject to any disclaimer, the term of this patent is extended or adjusted under 35 U.S.C. 154(b) by 852 days.

(21) Appl. No.: 12/489,582

(22) Filed: Jun. 23, 2009

(65) Prior Publication Data
US 2010/0192142 A1 Jul. 29, 2010

Related U.S. Application Data

(60) Provisional application No. 61/147,126, filed on Jan. 25, 2009.

(51) Int. Cl.
*G06F 9/44* (2006.01)
*G06F 15/02* (2006.01)
(52) U.S. Cl. .......................................... 717/168; 708/108
(58) Field of Classification Search ........................ None
See application file for complete search history.

(56) References Cited

U.S. PATENT DOCUMENTS

| | | | |
|---|---|---|---|
| 8,090,935 B2 * | 1/2012 | Anwar et al. ................ | 712/244 |
| 2008/0216064 A1 * | 9/2008 | Braswell ....................... | 717/149 |
| 2009/0143094 A1 * | 6/2009 | Shen et al. ................. | 455/550.1 |
| 2009/0197635 A1 * | 8/2009 | Kim et al. ................. | 455/550.1 |
| 2010/0257528 A1 * | 10/2010 | May ............................. | 718/102 |

OTHER PUBLICATIONS

Baratloo, A. et al., "Charlotte: Metacomputing on the Web," *9th International Conference on Parallel and Distributed Computing Systems (PDCS)*, 1996, eight pages.
Bershad, B. et al., "Extensibility, Safety and Performance in the SPIN Operating System," 1995, Dept. of Computer Science and Engineering, University of Washington, USA, seventeen pages.
Casas, J. et al., "MPVM: A Migration Transparent Version of PVM," Feb. 1995, Dept. of Computer Science and Engineering, Oregon Graduate Institute of Science & Technology, USA, thirty pages.
Doublis, F. et al., "Transparent Process Migration: Design Alternatives and the Sprite implementation," *Software—Practice and Experience*, Aug. 1991, pp. 757-785, vol. 21, No. 8.
Jul, E. et al., "Fine-Grained Mobility in the Emerald System," ACM Transactions on Computer Systems, Feb. 1988, pp. 109-133, vol. 6, No. 1.
Litzkow, M. et al., "Condor—A Hunter of Idle Workstations," *IEEE*, 1988, pp. 104-111.
Rozier, M. et al., "Overview of the CHORUS Distributed Operating Systems, CS/TR-90-25.1," *Chorus Systemes*, Feb. 1991, fifty-four pages.
Tanenbaum, A.S. et al., "Experiences with the Amoeba Distributed Operating System," *Communications of the ACM*, 1990, twenty-nine pages.

* cited by examiner

*Primary Examiner* — Kris Rhu
(74) *Attorney, Agent, or Firm* — Fenwick & West LLP (57) ABSTRACT

This invention generally relates to a methods and system in the field of independent programs operating within an operating system such as Linux and more particularly to computer software embodied in a computer readable medium including: an independent program for running autonomously in a native mode within an associated computer processor; an operating system program for running autonomously within an associated computer processor; a mode switcher process for switching operation from the independent program to the operating system program whereby the independent program functions as an embedded entity of the operating system; and wherein the mode switcher program switches the independent program from the operating system program whereby the independent program runs autonomously in the native mode.

20 Claims, 10 Drawing Sheets

SYSTEM AND METHODS FOR MIGRATING INDEPENDENTLY EXECUTING PROGRAM INTO AND OUT OF AN OPERATING SYSTEM

CROSS-REFERENCE TO RELATED APPLICATIONS

This application claims the benefit under 35 U.S.C. 119(e) of U.S. Provisional Application No. 61/147,126, System and Methods for Migrating Independently Executing Program into an OS and Thereafter out of the OS, filed Jan. 25, 2009, the entire disclosure of which is hereby incorporated by reference herein.

FIELD OF THE INVENTION

This invention generally relates to methods and system in the field of independent programs operating within an operating system (OS) such as Linux, and more particularly the same independent program can run autonomously on a processor without the OS running, using all or a portion thereof of the processor and/or other devices within the associated computer system.

BACKGROUND OF THE INVENTION

Software for many deeply embedded systems has been designed to execute as independent programs such that each can run by itself on a computer system without the support of an operating system. Such independent programs are relatively simple (e.g., single-threaded), and consume relatively small amounts of resources such as memory (RAM), time and electrical energy. Yet they are functionally sufficient to meet the original requirements of the embedded systems.

As computer systems evolve, new advanced functionalities, such as Internet capabilities, must be introduced into systems. These advanced features are typically more complex than what an independent program can handle, and usually require the support of a modern OS, such as Linux. The combination of the modern OS and the independent program enables a system to provide both original functionalities with the original independent program, as well as to provide those advanced functionalities that cannot be handled by the independent program itself.

One approach for introducing a modern OS into the system is to port the original independent program into the OS, and let the OS run on the embedded system at all times. Such approach works well for most systems, but less so for systems with power consumption constraints (and with compatibility requirements associated with such constraints), especially if the advanced functionalities are only needed occasionally. The original independent program typically consumes much less energy than a full modern OS, which typically uses a larger amount of memory (e.g., RAM) and IO devices. Having an OS running all the time thus poses a problem for energy-conscious systems. Additionally the independent program, not running stand-alone as in the original design, may pose potential backward-compatibility concerns due to different run-time characteristics (including higher power consumption levels, longer response latencies, etc).

One solution to the above problem is to introduce an additional version/copy of the independent program so as to run inside the OS. In this configuration a system maintains two versions of the independent program: one running autonomously, and the other running under the control of the OS. This configuration has two modes of operation: one used most of the time where the system runs the original independent program autonomously; and the other that loads and executes the OS only when there is need for carrying out tasks or applications that are not supported by the original independent program. The shortfalls of this approach are the extra development cost of the new version of the independent program for running within the OS, the maintenance overhead of two copies of the program, and the runtime complexity for maintaining the data consistency of the two copies of the independent program during mode switches.

By way of further background, one embodiment of the invention disclosed herein relates to process migration, which moves a live process (or thread, object) from one computer to another, primarily for load balancing and other system management purposes. There are mainly two approaches to process migration: one based on checkpoint/restart and typically doesn't require OS support, and the other relies on OS mechanisms. The checkpoint/restart based approach typically uses a user-level library to save process state at some well-defined points, and later restore such saved state. This approached is covered extensively by M. Litzkow, M. Livny, and M. Mutka, *Condor—A Hunter of Idle Workstations,* 8th International Conference on Distributed Computing Systems, 1988; E. Jul, H. Levy, N. Hutchinson, and A. Black, *Finegrained Mobility in the Emerald System*, ACM Transactions on Computer Systems, 6(1), 1988; A. Baratloo, M. Karaul, Z. Kedem, and P. Wyckoff. *Charlotte: Metacomputing on the Web*; Future Generation Computer Systems, 1999; and J. Casas, D. L. Clark, R. Konoru, S. W. Otto, R. M. Prouty, and J. Walpole, *MPVM: A Migration Transparent Version of PVM Computing Systems*, The Journal of the USENIX Association, 8(2), Spring 1995. This approach normally restricts what the process can do when migrating. For example, the process cannot be involved in I/O operations. The OS-level approach uses OS facilities to capture and move the internal state of a process as well as any kernel state related to the process, optionally leaving behind a proxy on the source site to handle any "residual dependencies" (e.g., active network connections). See for example: M. Rozier, V. Abrossimov, F. Armand, M. Gien, M. Guillemont, F. Hermann, and C. Kaiser, *Chorus (Overview of the Chorus Distributed Operating System)* Proceedings of the USENIX Workshop on Micro-Kernels and Other Kernel Architectures, 1992; A. Tanenbaum, R. van Renesse, H. van Staveren, G. Sharp, S. Mullender, J. Jansen, and G. van Rossum, *Experiences with the Amoeba Distributed Operating System*, Communications of the ACM, 33(12), 1990; B. N. Bershad, S. Savage, P. Pardyak, E. G. Sirer, M. Fiuczynski, D. Becker, S. Eggers and C. Chambers, *Extensibility Safety and Performance in the SPIN Operating System,* 15th Symp. On Operating Systems Principles, December 1995; and F. Douglis and J. Ousterhout, *Transparent Process Migration: Design Alternatives and the Sprite Implementation*, Software-Practice and Experience, 21(8), 1991. Such an approach is applicable to the migration of any general process, but incurs significant run-time overheads in addition to operating system complexity and maintainability costs. The invention herein provides a process that consumes relatively low amounts of resources (including energy).

As will become apparent below, several key differences exist between the inventive system and method herein disclosed and a process migration system as discussed above. First, while the source and destination environments in process migration both involve an operating system, the invention herein concerns the migration of a live, active program between an OS and the hardware environment directly. Second, while process migration is between different processors and requires the recreation of the process image at the destination, the invention herein, does not require that the OS recreate in memory an image of the program migrated in and out of the OS. Lastly, regarding the invention herein, migration decisions are made based on the runtime needs and tradeoffs between conserving energy and supporting new functionalities. This is different from the common purposes of process migration systems.

SUMMARY OF THE INVENTION

This invention generally relates to a methods and system in the field of independent programs operating within an OS such as Linux and more particularly to computer software embodied in a computer readable medium including: an independent program for running autonomously in a native mode within an associated computer processor; an operating system program for running autonomously within an associated computer processor; a mode switcher process for switching operation from the independent program to the operating system program whereby the independent program functions as an embedded entity of the operating system; and wherein the mode switcher program switches the independent program from the operating system program whereby the independent program runs autonomously in the native mode.

This invention further relates to a computer method including the steps of: executing an independent program for running autonomously in a native mode within an associated computer processor; executing an operating system program for running autonomously within the associated computer processor; and executing a mode switcher program for switching operation from the independent program to the operating system program whereby the independent program functions as an embedded entity of the operating system; and executing the mode switcher program to switch the independent program from the operating system program whereby the independent program runs autonomously in the native mode.

This invention further relates to a computer system for an independently executing native program that migrates into an operating system and migrates out of the operating system to again function independently including: a CPU and memory for storing and executing a computer readable medium further including: an independent program for running autonomously in a native mode within an associated computer processor; an operating system program for running autonomously within the associated computer processor; a mode switcher program for switching operation from the independent program to the operating system program whereby the independent program functions as an embedded entity of the operating system; and wherein the mode switcher program switches the independent program from the operating system program whereby the independent program runs autonomously in the native mode.

DETAILED DESCRIPTION OF THE INVENTION

The following detailed description includes the best mode of carrying out the invention and is made for the purpose of illustrating the general principles of the invention and should not be taken in a limiting sense. The scope of the invention is determined by reference to the claims. Each part or function is assigned, even if structurally identical to another part, a unique reference number wherever that part is shown in the drawing figures.

The invention disclosed herein relates to a method and a system that allows the same original program to run continuously in native mode (mode of a computer executing programs from its built-in instruction set), as well as run continuously inside the OS. In this type of arrangement the system runs the independent program autonomously for resource conservation and the same independent program is used to run inside the OS, thus saving development, maintenance, and runtime costs.

Figure 1:
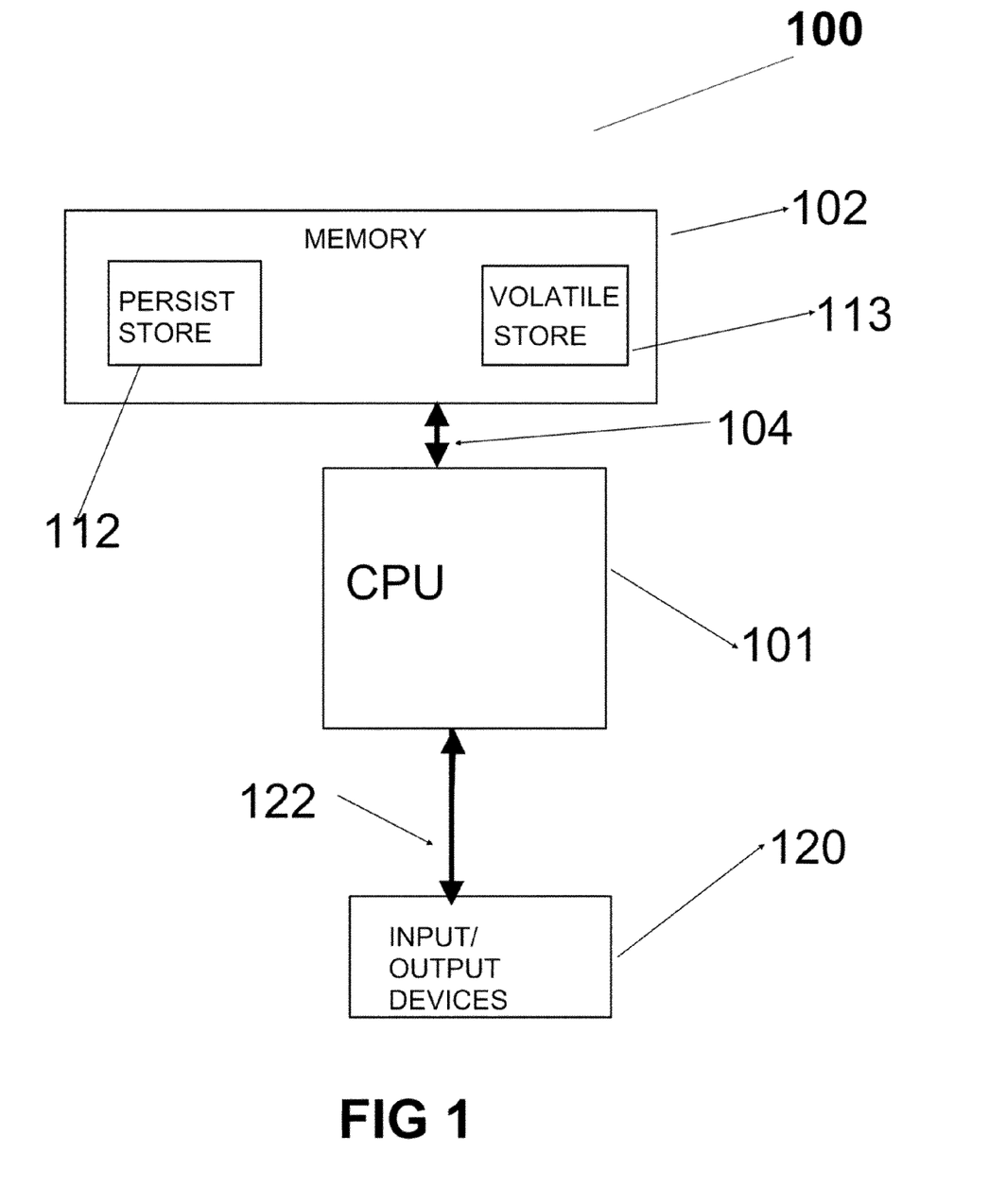
FIG. 1 is a block diagram of a computer system suitable for executing a program in accordance with an embodiment of the invention.

Referring to FIG. 1, a block diagram illustrates a system 100 suitable for storing a program and executing a computer process according to embodiments of the present invention that allows the same original program to run continuously in native mode as well as inside the OS. Generally, system 100 takes the form of a computer system that includes at least one OS and an independent program as more fully described below with regard to the migration of a live, active program between the OS and the hardware environment.

The computer system 100 may be any system that includes at least a processor (CPU) and memory, including, but not limited to, computer systems generally, mobile computers, servers, or a handheld devices, such as cell phones. These systems may be embodied in smart cards or SIM cards, and include various types of software, firmware, and hardware. FIG. 1 illustrates a block diagram 100 of an exemplary computing system that implements a smart card. Central Processing Unit (CPU) 101 communicates with a memory module 102, via bus 104. The memory module comprises at least a persistent memory 112 and a volatile memory 113. The CPU 101 communicates with input/output (I/O) devices 120, via bus 122.

Those skilled in the art of computer programming will appreciate that the invention may be implemented in a system of computer units communicatively coupled to one another over a network, such as a wide area network, local area network or the global interconnection of computers and computer networks commonly referred to as the Internet. Although the present invention is preferably drawn to a SIM card as used in a cell phone, such a network may also include computers used in other applications such as server computers (servers) to carry out the methodology described herein. "Processor", as used herein, refers generally to a computing device including a CPU, such as a microprocessor. A CPU generally includes an arithmetic logic unit (ALU), which performs arithmetic and logical operations, and a control unit, which extracts instructions (e.g., code) from memory and decodes and executes them, calling on the ALU when necessary. "Memory", as used herein, refers to one or more devices capable of storing data, such as in the form of chips, tapes, disks or drives. Memory may take the form of one or more random-access memory (RAM), read-only memory (ROM), programmable read-only memory (PROM), erasable programmable read-only memory (EPROM), or electrically erasable programmable read-only memory (EEPROM) chips including Flash memory, memory referred to as persistent memory and other memory referred to as volatile memory by way of further non-limiting example only. Memory may be internal or external to an integrated unit including a processor. Memory may be internal or external to an integrated unit including a personal computer. Memory preferably stores a computer program, e.g., sequence of instructions being operable by a processor.

By way of further non-limiting example, in a distributed implementation, the inventive system herein that allows the same original program to run continuously in native mode as well as inside the OS embodied in cell phones or other mobile devices, telephones and telephone interfaces, database file servers, input devices and output devices configured by software for accumulating, processing, administering and analyzing attributes in an automated environments. "Server", as used herein, generally refers to a computer or device communicatively coupled to a network that manages network resources. For example, a file server is a computer and storage device dedicated to storing files, while a database server is a computer system that processes database queries. A server may refer to a discrete computing device, or may refer to the program that is managing resources rather than an entire computer.

By way of further, non-limiting example, one embodiment of the system 100 that allows the same original program to run continuously in native mode as well as inside the OS including a CPU 101 having an ALU for making mathematical calculations, and associated memory registers, program controls, circuitry for input output associated with I/O 120 and memory 102. The I/O 120 may also facilitate access to a local area network or other network of computers (neither illustrated), if required or desired. CPU 101 both controls, and is controlled by, other hardware, as well as software stored in memory 102.

Figure 2:
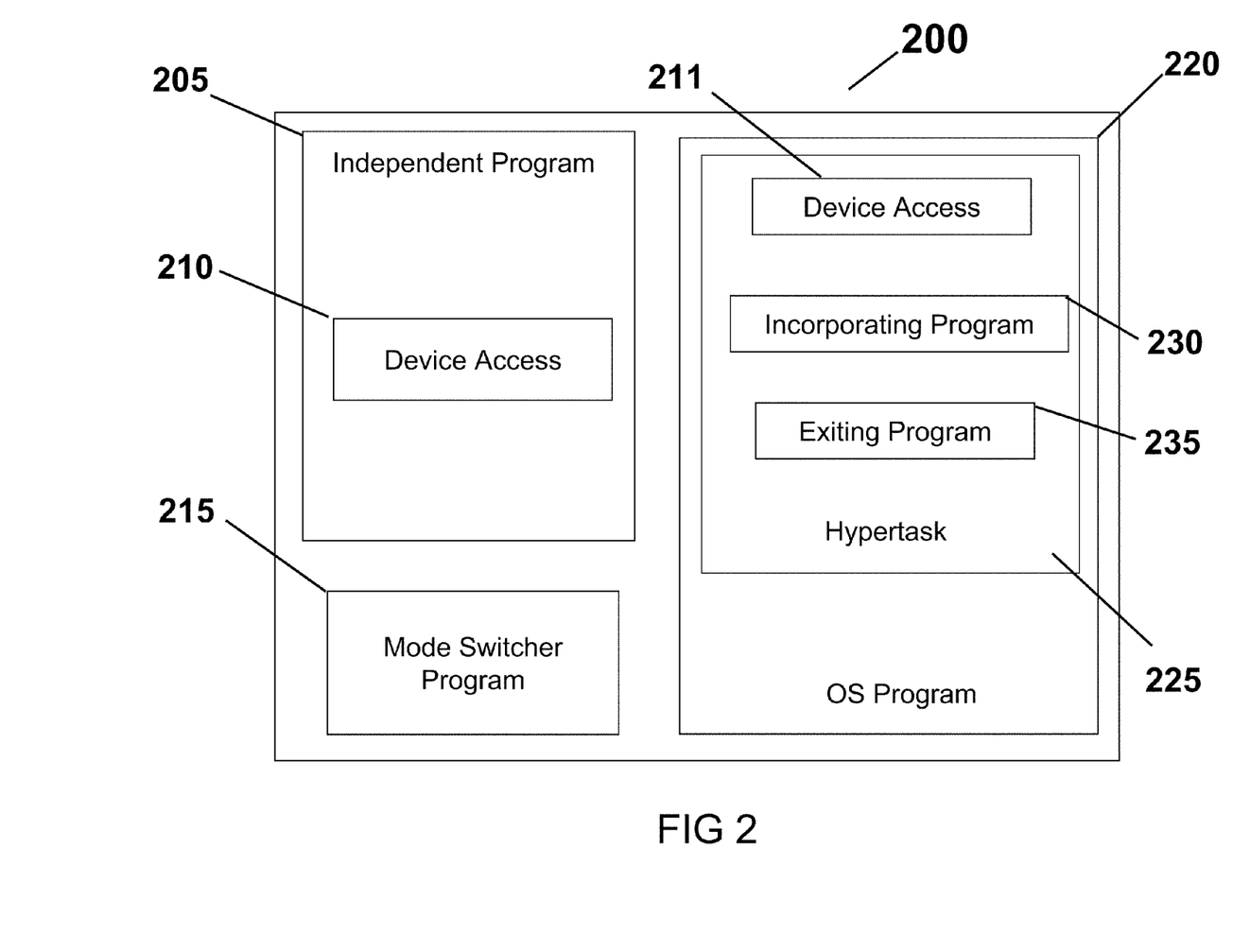
FIG. 2 shows the logical components of the system in accordance with an embodiment of the invention.

With reference to FIG. 2 block diagram and FIG. 3 state diagram, the software system 200 includes independent program 205 running autonomously in a native mode 315 within the computer system 100 as described in connection with FIG. 1. In one embodiment of the invention, computer software is embodied on a computer readable medium including: the independent program 205 for running autonomously in native mode 315 within the associated computer processor, such as CPU 101; an operating system 220 program for running autonomously within an associated computer processor such as CPU 101; a mode switcher 215 process for switching operation from the independent program 205 to the operating system 220 program whereby the independent program 205 functions as an embedded entity of the operating system 220; and an exiting program 235 method that switches operation from the operating system 220 to the independent program 205 whereby the independent program is switched back to run autonomously in native mode.

The OS 220 can be loaded during the execution of the independent program 205 by a mode switcher 215 program, which can either be a standalone program of the system 200, or it can be made up of instructions included within the independent program 205. Upon the OS 220 execution a program and associate method associated within the system 200, referred to as an incorporating program 230, allows integration of the independent program 205 into the OS 220, such that the independent program 205 then functions as an entity of the OS 220. This execution mode of the system is called the embedded mode represented by the active state 320 (FIG. 3). The system 200 can later be switched back to running autonomously in native mode 315 through the program and method associated with the system 200, referred to as the exiting program 235. Once back in the native mode 315, the system 200 can again switch to the embedded mode represented by the active state 320 (FIG. 3) when necessary, and repeated as required by the particular application with which the process is associated. The system 200 can reach a state referred to as an end state 325 where the process 200 stops functioning in either the native mode 315 state or the embedded mode 320 state. Programming to accomplish the objects of changing the state of the computer to achieve the system operation described with reference to FIG. 2 and FIG. 3 are well know by those of ordinary skill in the art of programming.

Figure 3:
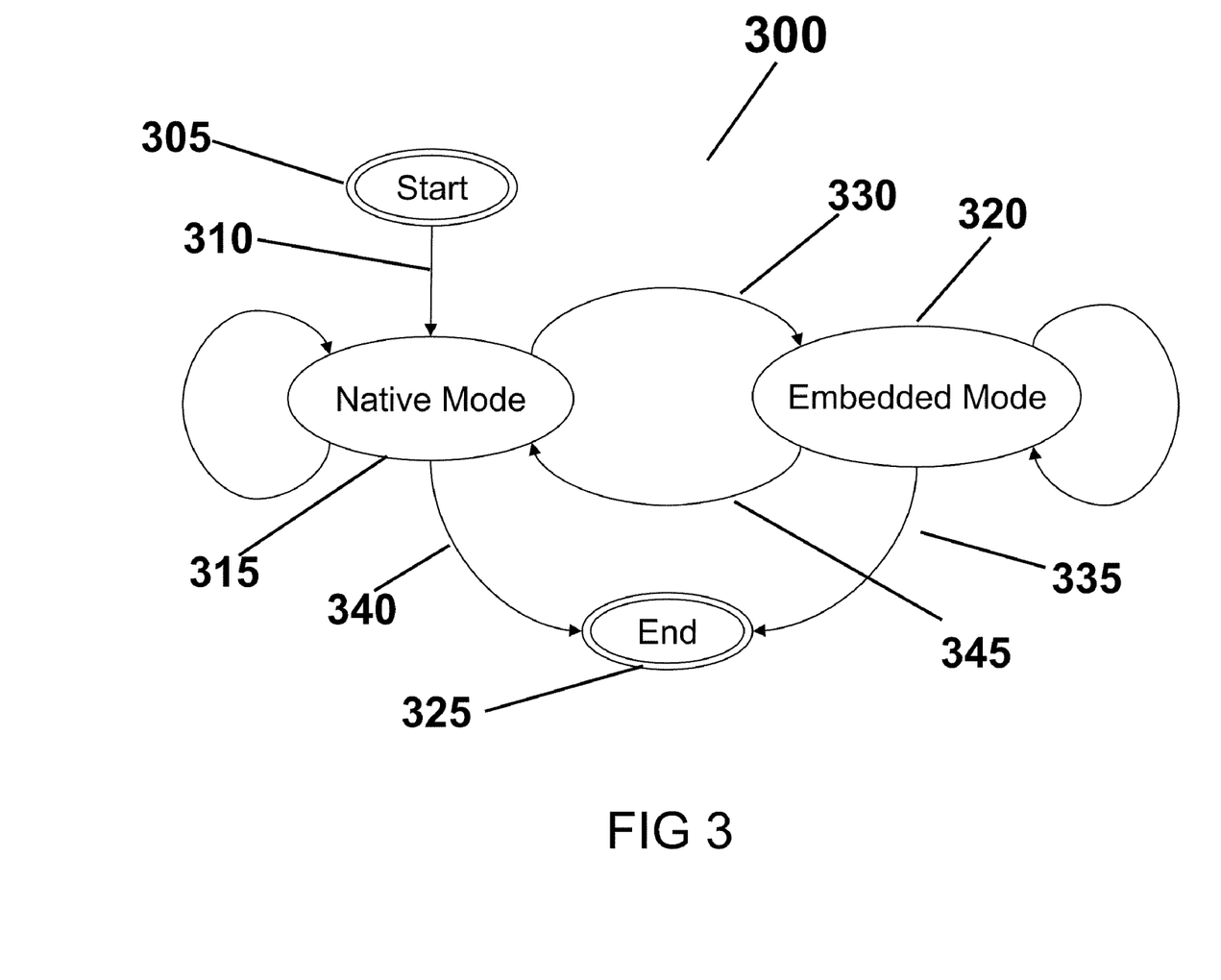
FIG. 3 shows two operation modes of the system and the transitioning between the two modes in accordance with an embodiment of the invention.

With further reference to FIG. 2, the mode switcher 215 functions as glue code to assist mode transitioning such as illustrated in FIG. 3, states 330, 335, 340. It performs tasks such as loading the OS 220 and saving/restoring the context of the independent program 205. It only runs transiently during mode switches.

FIG. 2 independent program 205 contains a device access means 210 for the native mode 315 (FIG. 3). The device access means 210 abstracts the access to hardware devices on the system 200 needed by the independent program 205. The device access means 210 for the independent program includes a device access program resident in the computer 100 environment. The actual implementation of the device access means 210 is transparent to the rest of the independent program 205, and can be coupled and decoupled from the independent program 205 at run-time when system 200 execution mode changes. Programming to accomplish the objectives of abstracting the access to hardware devices on a software system 200 needed by the independent program is well known by those of ordinary skill in the art of programming.

The OS 220 includes a hypertask 225, which is a schedulable runtime entity that provides an environment for the independent program to execute inside the OS 220. The hypertask 225 appears as a normal entity (such as a process or a thread) to the OS 220 kernel, and is subject to scheduling just like other OS 220 entities. The OS 220 kernel is a central component of acting to manage the system's resources such as the communication between hardware and software components. The kernel also provides the lowest-level abstraction layer for the resources (especially memory, processors and I/O devices) that application software must control to perform its function. It typically makes these facilities available to application processes through inter-process communication mechanisms and system calls. The hypertask 225 contains another implementation of device access means 211 for the embedded mode 320 that allows the independent program 205 to access devices from within the OS 220 environment.

The hypertask 225 also contains an incorporating program 230 and an exiting program 235. The incorporating program 230 handles the process of transferring operation of the independent program 205 to the OS 220 when the system 200 switches from the native mode 351 to the embedded mode 320 during transition 330 (FIG. 3). Specifically, the incorporating program 230 changes device access coupling so that the independent program 205 uses the device access means 211 provided by the hypertask 225. The program also resumes execution context of the independent program 205, which was suspended by the mode switcher 215 program at the start of the mode switching operation.

In one non-limiting embodiment transitioning from native mode 315 to embedded mode 320 the transition 330 includes storing the context of the independent program 205 and starting the OS 220 process. In transitioning from embedded mode 320 to the native mode 315 transition 345 includes storing the context of the independent program 205, shutting down the OS 220 process, jumping to the mode switcher 215 and resuming the independent program 205.

When the OS 220 terminates, the exiting program 235 transitions 345 the independent program 205, moving it out of the OS 220 and reverting it back to native mode 315 execution. Specifically, the exiting program 235 obtains and saves the current execution context of the independent program 205, changes device access coupling to use the device access means 210 contained within the independent program 205, and terminates the execution of the hypertask 225.

The invention herein thus enables the same program to run both independently and as an entity of an operating system, and to dynamically switch between the two modes with the independent program 205 running continuously.

Figure 4:
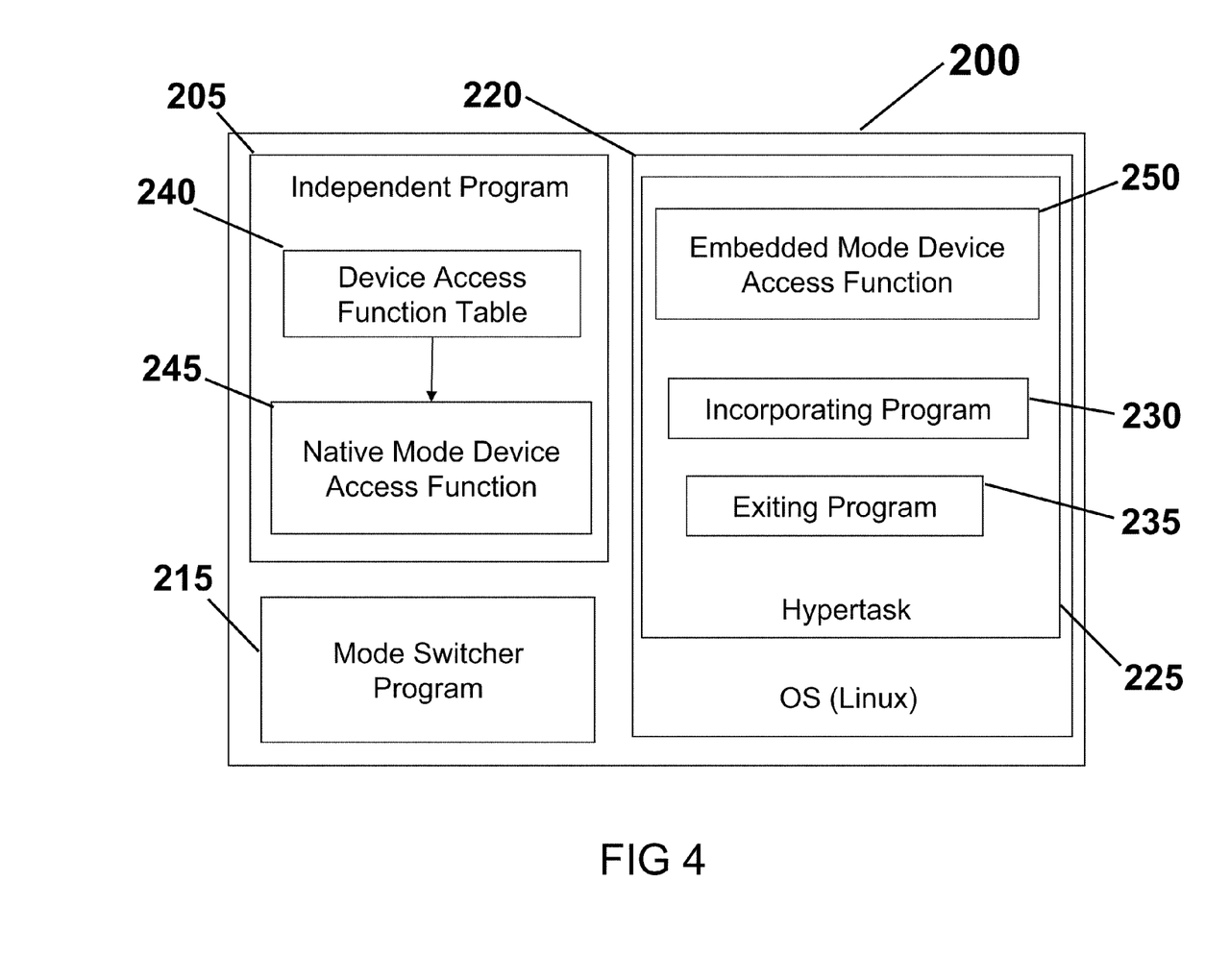
FIG. 4 illustrates the system with Linux as OS and with a Device Access Function Table based Device Access Means in accordance with an embodiment of the invention.

The present invention, relates to the FIG. 4 shows one embodiment of the system 200. In this embodiment, a Linux is used as the general purpose OS 220 for the embedded mode 320 (FIG. 3). The hypertask 225 is implemented as a user-level process.

The mode switcher 215 and the independent program 205 comprise two separate programs, each of which has its own exclusive, non-overlapping memory area in system 100 (such as memory 4 and one or more file storage mediums 12, including code, data, heap, stack, etc). When Linux OS 220 later starts, it will use a memory area for its own operation, which does not overlap with either of mode switcher's 215 memory area or independent program 205 memory area. In this embodiment the mode switcher 215 has one fixed, well-known entrance point for performing the switch from native mode 315 to embedded mode 320 (FIG. 3). When such switch is requested, the independent program 205 will jump to this fixed entrance point to start the mode switching.

The device access means 210 for independent program 205 is implemented with a device access function table 240, plus the code segments for interacting with hardware devices. There are two sets of such code segments: a native mode device access function 245 that directly interacts with the hardware devices (i.e., through reading/writing I/O ports), residing within the independent program 205, and used by the rest of the independent program 205 when the system is in the native mode 315; and an embedded mode 320 device access function 250 that resides in hypertask 225 and use Linux OS 220 to construct such as device files to interact with hardware devices, and are used by the rest of the independent program 205 when the system 200 is in the embedded mode 320 (FIG. 3). In this embodiment, coupling the independent program 205 with the device access means 210 for the embedded mode 320 in the incorporating method 230 is achieved through updating entries of the device access function table 240 to point to the embedded mode device access functions 250. Similarly, coupling the independent program 205 with the device access means 210 for the native mode 315 during the exiting program 235 process is achieved through updating entries of the device access function table 240 entry set to point to the native mode device access functions 245.

Figure 5:
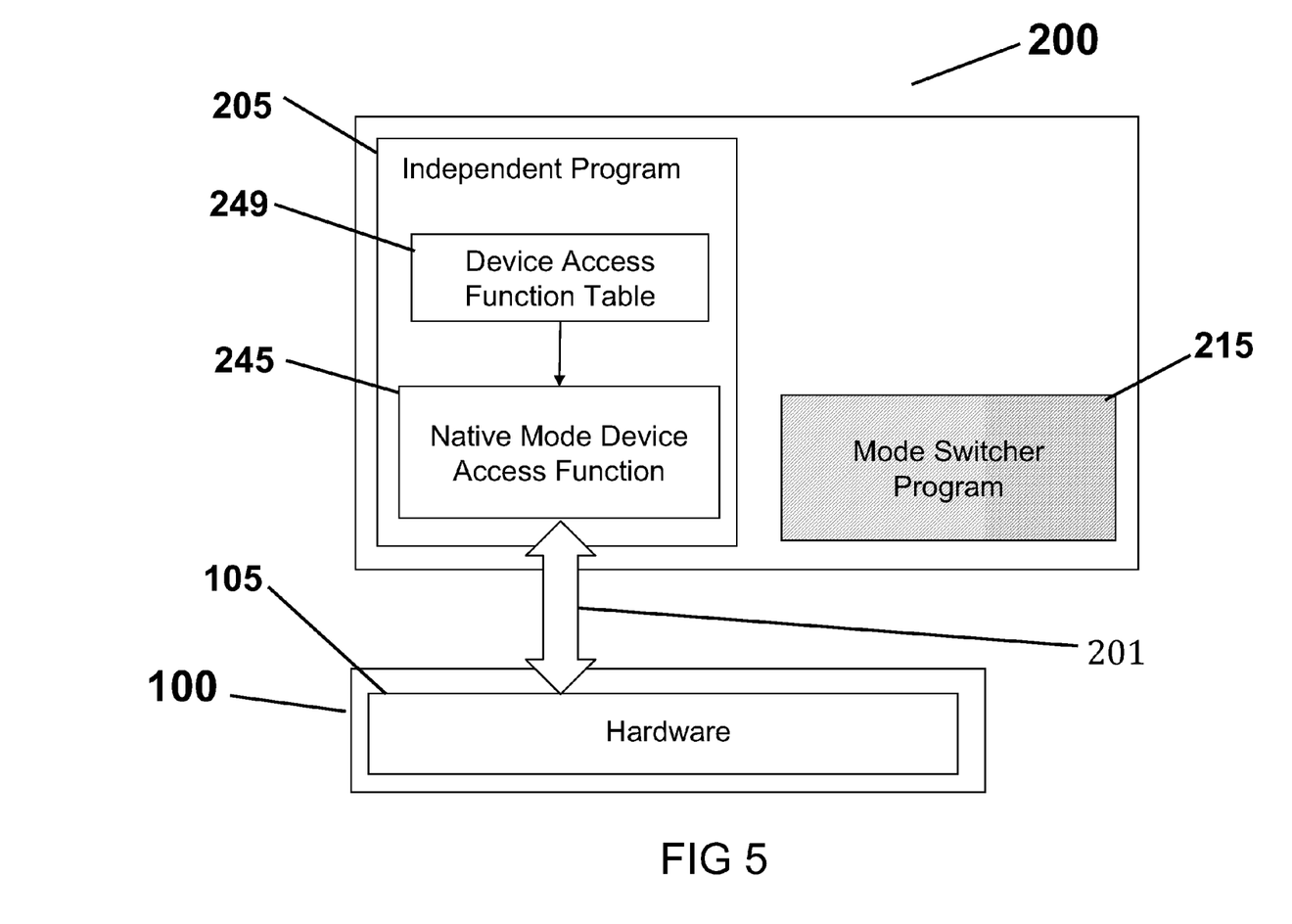
FIG. 5 illustrates the layered components of the system when in Native Mode in accordance with an embodiment of the invention.

FIG. 5 shows the layered/stacked components of the system that are in use when the system 200 is in native mode 315 (FIG. 3). The computer 100 having associated physical systems embodied in hardware 105, on top of which are the independent program 205 and the mode switcher 215. Within the independent program 205 there are native mode device access functions 245, which handles device I/O operations 201 under native mode 315 (FIG. 3). The independent program 205 also includes a device access function table 249 entry set which is used by the rest of the independent program 205 for indirect invocation of device access mean 210 functions. In native mode 315, each entry in the device access function table 249 entry set points to a proper native mode 315 device access function. The mode switcher 215 is dormant at all time until a mode switch occurs, during which period it runs until the system enters embedded mode 320 is invoked.

Figure 6:
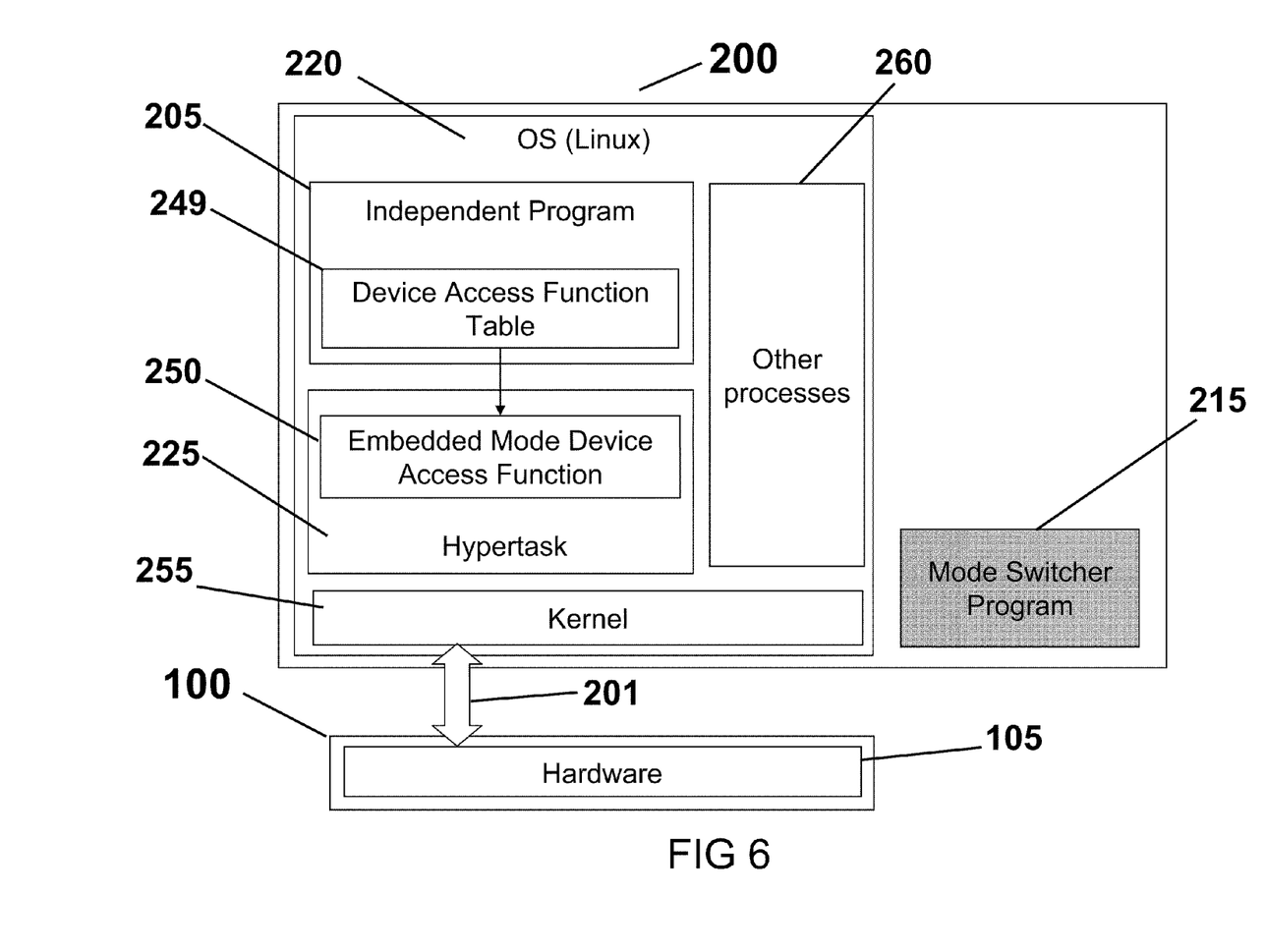
FIG. 6 illustrates the layered components of the system when in Embedded Mode in accordance with an embodiment of the invention.

The system 200 switches to embedded mode 320 when it is requested to handle tasks that can't be handled by the independent program 205. FIG. 6 shows the layered components of the system 200 that are in use when the system is in embedded mode 320 (FIG. 3). Hardware 105 interfaces with the Linux OS 220 and the mode switcher 215. Within Linux OS 220, the kernel 255 lies at the lowest layer. A hypertask 225 and other Linux OS 220 processes 260 sit above the kernel 255. To the kernel 255, the hypertask 225 looks no different from other processes, and the kernel 255 schedules the hypertask 225 as it would schedule other processes of the system 200. The hypertask 225 in particular contains embedded mode device access 250 functions, as well as program instructions implementing the incorporating program 230 process and the exiting program 235 process. The independent program 205 is now mapped into Linux OS 220 and sits on top of the hypertask 225. The entry set of the device access function table 249 now points to the embedded mode 320 (FIG. 3) device access means 210 functions within the hypertask 225. The rest of the independent program 205, however, remains the same as when the system 200 was in native mode 315 (FIG. 3).

Figure 7:
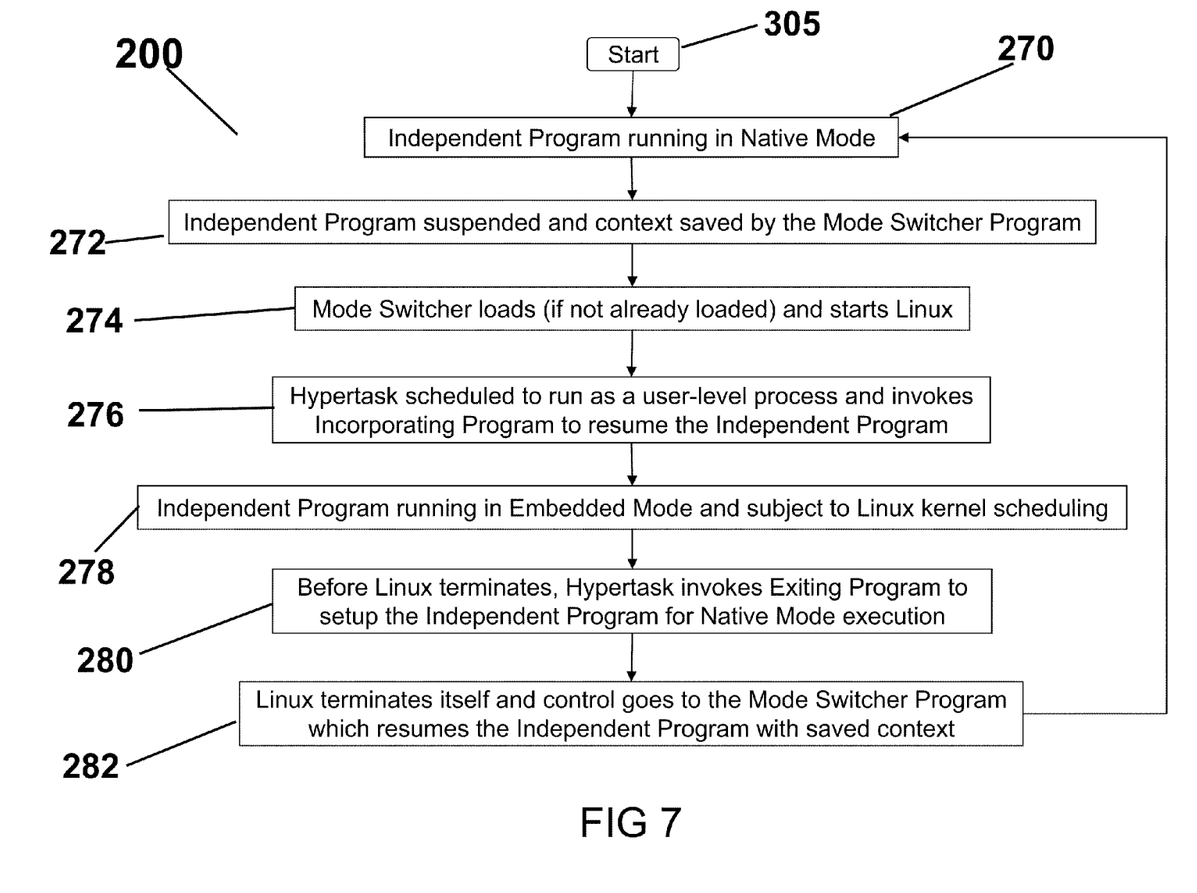
FIG. 7 shows the high-level sequential flow of the operation of the system in accordance with an embodiment of the invention.

FIG. 7 is a flow chart of an aspect of the system 200 process showing the steps involved in mode/state transitioning, such as FIG. 3, transitions 330, 335, 340 and 345. At the start of system 200 state 305 boots 310 into native mode 315 (FIG. 3) in step 270 the independent program 205 is the only program running in system 200. Later when requested to switch to the embedded mode 320 (FIG. 3), the independent program 205 jumps to the well-known fixed entrance in mode switcher 215. In step 272 the independent program is suspended and the context parameters are saved by the mode switcher 215. In step 274, the mode switcher 215 then loads the Linux OS 220, if it's not already loaded, and starts Linux OS 220. In step 276 the Linux OS 220 eventually creates the hypertask 225, which, at startup, invokes the incorporating program 230 process to resume in step 278 the execution of the independent program 205 in the embedded mode 320 (FIG. 3). Also in step 278 the hypertask 225, and consequently also the independent program 205, are subject to the scheduling of the kernel 255 just like other processes of Linux OS 220.

As illustrated in step 280, when there is no need to run Linux OS 220 anymore, the system 200 switches or transitions 348 back to the native mode 315 from the embedded mode. The hypertask 225 exiting method 235 process is invoked to suspend the execution of the independent program 205 and to save a copy of its current execution parameter context. In step 282 Linux OS 220 terminates, CPU 101 (FIG. 1) control goes back to the mode switcher 215, which then resumes the execution of the independent program 205 from the suspended context parameters as setup by the exiting method 235 process. The independent program 205 thereafter resumes as the only program running in the native mode 315.

Figure 8:
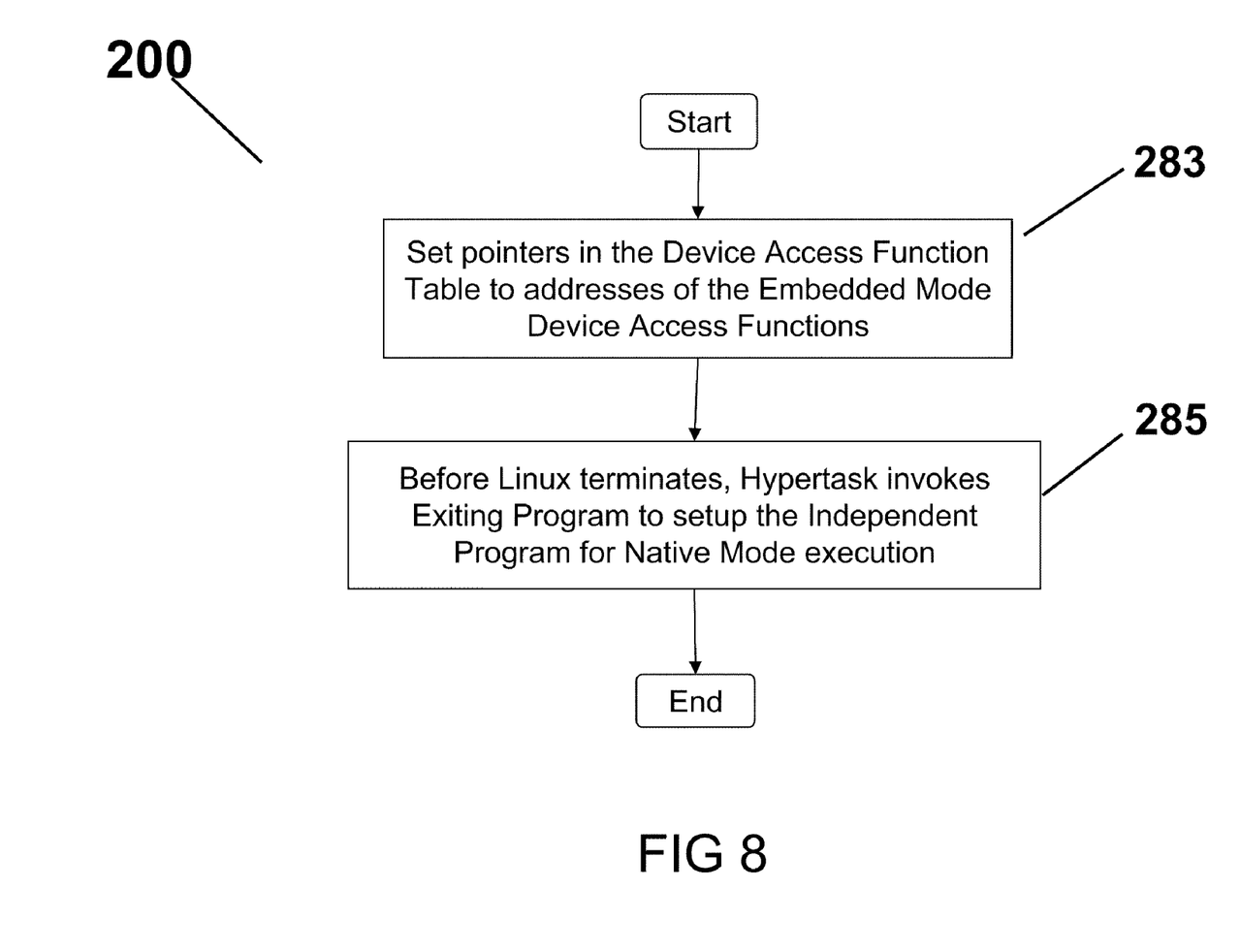
FIG. 8 shows the process for switching from Native mode to Embedded Mode in accordance with an embodiment of the invention.

FIG. 8 shows one non-limiting embodiment of the incorporating process 205. The step 283 process 200 sets the values of the pointers in the device access function table 240 to the addresses of the embedded mode device access function 250. In step 285 the process 200 then retrieves from the mode switcher 215 the execution context parameters of the independent program 205 saved when the independent program 205 had been suspended, and restores the execution state of the independent program 205 with this retrieved state, including restoring general register values, setting up stack and jumping to the saved CPU 101 program counter location to resume process execution.

Figure 9:
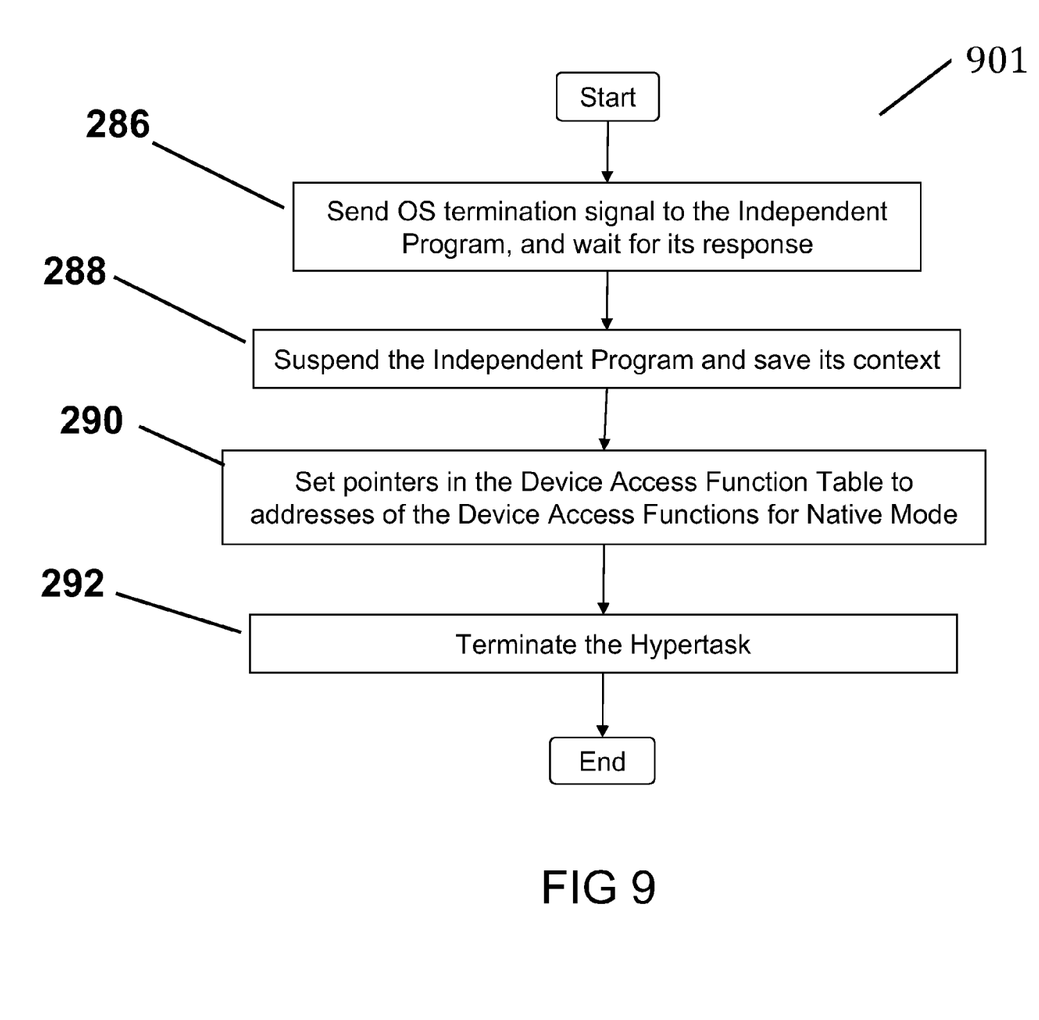
FIG. 9 shows the process for switching from Embedded Mode to Native Mode in accordance with an embodiment of the invention.
Figure 10:
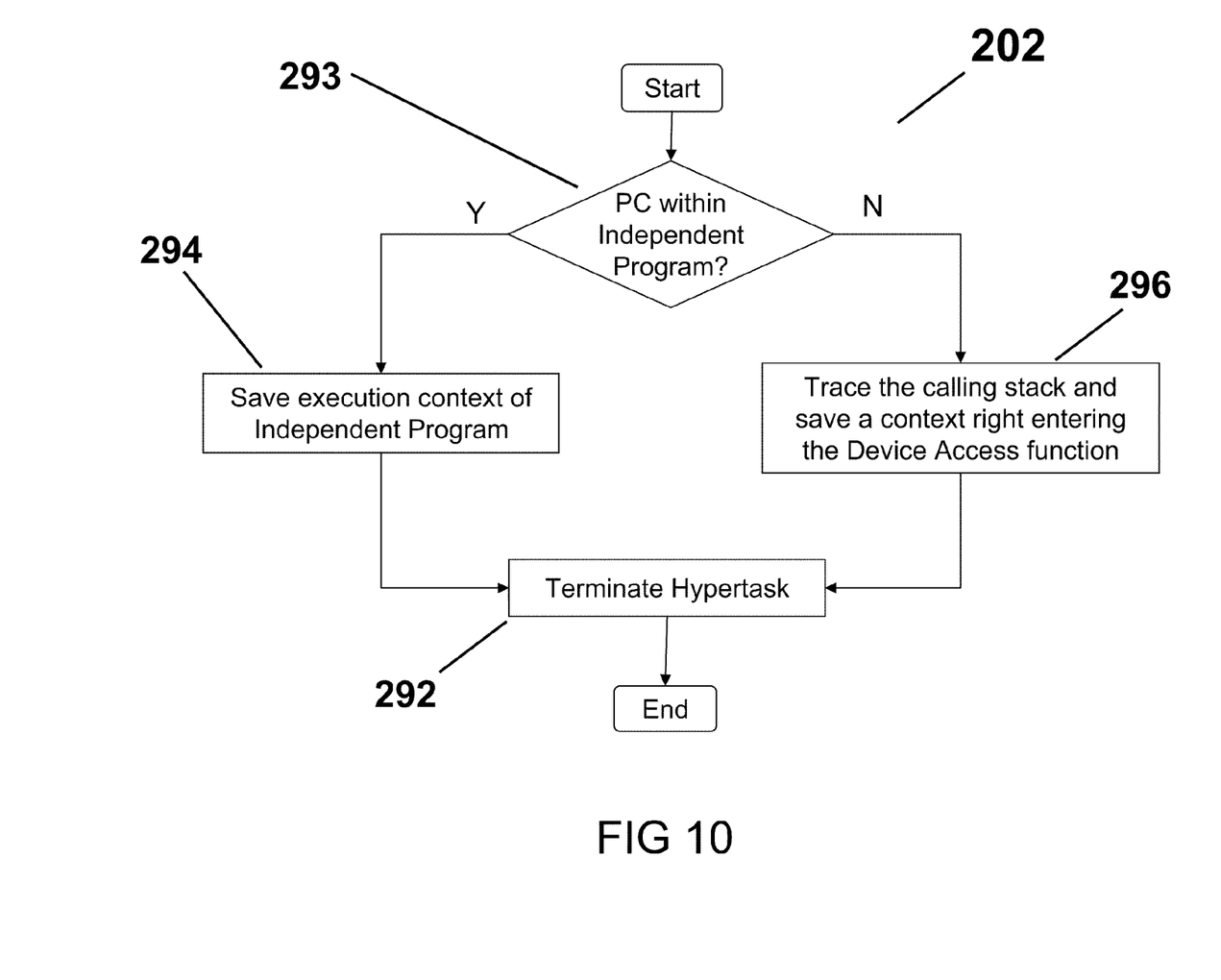
FIG. 10 shows the processing flow of one embodiment of the signal handler within the hypertask in accordance with an embodiment of the invention.

FIG. 9 shows a non-limiting embodiment of the invention illustrating the exiting program 235 process 901. In step 286 the process 901 sends an OS 220 termination signal to the independent program 205 and waits for its response. In step 288 the process 901 then suspends the independent program 205 and saves its execution parameter context, and in step 290 sets the values of the pointers in the device access function table 249 to the addresses of the native mode 315 device access means 210 functions. The process finally terminates the hypertask 225 itself. In this embodiment, mode switching is prohibited if the independent program is in the middle of executing a device access means 210 function. A signal handler 202 (FIG. 10) provided by the hypertask 225 handles the OS 220 termination signal sent to the independent program 205. The processing flow of the signal handler as illustrated in FIG. 10 illustrates a step 293, wherein the signal handler 202 first checks 293 whether the independent program 205 is executing inside one of the embedded mode 320 device access means 210 function, by checking whether the CPU 101 program counter is outside the known range of address spaces of the independent program 205. If the independent program 205 is outside device access means 210 function address space, in step 294 the signal handler saves the independent program 205 execution context parameters, and in step 292 terminates the hypertask 225. Otherwise, with assistance of device access means 210 function, the signal handler 202 in step 296 traces the calling stacks, saves a context parameters before entering the device access means 210 function and in step 292 terminates the hypertask 225. In this case, when the independent program 205 resumes its execution in native mode 315 (FIG. 3), it will re-issue the function call to the specific device access means 210 function implemented in native mode 315 (FIG. 3). In an alternative embodiment, the OS 220 communicates with the independent program 220 via hypertask 215 before deciding to terminate itself. In this case, hypertask 225 will setup a pre-defined context of the independent program 205 during the exiting program 325 process.

While the foregoing invention has been described with reference to the above embodiments, additional modifications and changes can be made without departing from the spirit of the invention. Accordingly, such modifications and changes are considered to be within the scope of the appended claims.

We claim:

1. A non-transitory computer readable medium comprising:

a mode switcher program for switching operation of an independent program from a native mode in which the independent program runs autonomously within an associated computer processor to an embedded mode in which the independent program functions as an embedded entity of an operating system running autonomously within the associated computer processor, and wherein the mode switcher program saves a context of the independent program and loads the operating system which restores the context of the independent program.

2. The medium of claim 1 wherein the independent program further includes a device access program for the native mode to abstract access to hardware devices resident in an environment of the computer processor.

3. The medium of claim 2 wherein running the device access program is transparent to the independent program, and wherein the device access program is coupled or decoupled from the independent program at run-time when execution mode changes.

4. The medium of claim 1 further comprising a hypertask program for runtime scheduling of the independent program to execute inside the operating system.

5. The medium of claim 4 wherein the hypertask program executes as a normal entity subject to operating system scheduling.

6. The medium of claim 4 wherein the hypertask program includes an incorporating program and an exiting program.

7. The medium of claim 6 wherein the incorporating program either moves the independent program into the operating system or remains in a fixed memory location while restoring its context into the operating system.

8. The medium of claim 6 wherein the incorporating program changes a device access coupling such that the independent program uses a device access means provided by the hypertask program.

9. The medium of claim 6 wherein the exiting program transitions the independent program to native mode.

10. The medium of claim 6 wherein the exiting program obtains and saves a current execution context of the independent program.

11. The medium of claim 6 wherein the exiting program changes device access coupling to use a device access means contained within the independent program, and terminates the execution of the hypertask program.

12. The medium of claim 4 wherein the hypertask program is implemented as a user-level process.

13. The medium of claim 1 wherein the mode switcher program and the independent program comprise two separate independent programs.

14. The medium of claim 13 wherein the operating system and the independent program are stored in non-overlapping memory areas.

15. The medium of claim 1 wherein the mode switcher program has a fixed entrance point for performing a switch from native mode to the embedded mode.

16. The medium of claim 15 wherein the independent program jumps to the fixed entrance point to start the switch from native mode to the embedded mode.

17. The medium of claim 2 wherein the device access program for the independent program is implemented with a device access function table plus code segments for interacting with hardware devices.

18. A computer method comprising:

executing, by a processor, a mode switcher program to switch operation of an independent program from a native mode in which the independent program runs autonomously within the processor to an embedded mode in which the independent program functions as an embedded entity of an operating system running autonomously within the processor, and wherein the mode switcher program saves a context of the independent program and loads the operating system which restores the context of the independent program.

19. A computer system comprising:

a processor; and a non-transitory computer readable medium storing processor-executable computer program instructions comprising a mode switcher program for switching operation of an independent program from a native mode in which the independent program runs autonomously within an associated computer processor to an embedded mode in which the independent program functions as an embedded entity of an operating system running autonomously within the associated computer processor, and wherein the mode switcher program saves a context of the independent program and loads the operating system which restores the context of the independent program.

20. A non-transitory computer readable medium comprising:

a mode switcher program for switching operation of an independent program from an embedded mode in which the independent program functions as an embedded entity of an operating system running autonomously within an associated computer processor to a native mode in which the independent program runs autonomously within the associated computer processor, and wherein the mode switcher program takes over execution control of the associated computer processor and restores a context of the independent program saved by the operating system.

\* \* \* \* \*